(12) United States Patent
Yamamoto (10) Patent No.: US 8,319,847 B2
(45) Date of Patent: Nov. 27, 2012

(54) IMAGING APPARATUS

(75) Inventor: Hideaki Yamamoto, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 348 days.

(21) Appl. No.: 12/829,201

(22) Filed: Jul. 1, 2010

(65) Prior Publication Data

US 2011/0001870 A1    Jan. 6, 2011

(30) Foreign Application Priority Data

Jul. 3, 2009    (JP) .................................. 2009-158481

(51) Int. Cl.
   *H04N 5/225*    (2006.01)
   *H04N 5/238*    (2006.01)

(52) U.S. Cl. .................................... 348/219.1; 348/363

(58) Field of Classification Search .............. 348/219.1, 348/351, 362, 363
   See application file for complete search history.

(56) References Cited

U.S. PATENT DOCUMENTS

| 4,535,363 A * | 8/1985 | Harada et al. .............. 348/219.1 |
| 5,212,598 A * | 5/1993 | Kikuchi ........................ 359/823 |
| 2009/0086083 A1 * | 4/2009 | Kunishige et al. ............ 348/345 |

FOREIGN PATENT DOCUMENTS

| JP | 2005-148610 A | | 6/2005 |
| JP | 2005148610 A | * | 6/2005 |
| JP | 2008-026451 A | | 2/2008 |

OTHER PUBLICATIONS

JP 2005-148610 A, Jun. 2005, Haseno, Shinichi, Machine Translation of JP 2005-148610 A.*

* cited by examiner

*Primary Examiner* — Chieh M Fan
*Assistant Examiner* — Wesley J Chiu
(74) *Attorney, Agent, or Firm* — Canon U.S.A, Inc. IP Division (57) ABSTRACT

An apparatus includes an imaging unit including an image sensor configured to photoelectrically convert an object image formed by a photographic lens, a light-blocking member configured to adjust an exposure time of the image sensor by mechanically closing an aperture thereof to block a light flux from the photographic lens from entering the image sensor through the aperture, and a driving unit configured to drive the imaging unit along an optical axis within a range including a position where at least a part of the imaging unit is inside the aperture of the light-blocking member.

5 Claims, 7 Drawing Sheets

FIG. 7B

IMAGING APPARATUS

BACKGROUND OF THE INVENTION

1. Field of the Invention

The present invention relates to an imaging apparatus. Particularly, the present invention relates to an imaging apparatus capable of making focus adjustments more precisely without causing an increase in size of the apparatus.

2. Description of the Related Art

Figure 6:
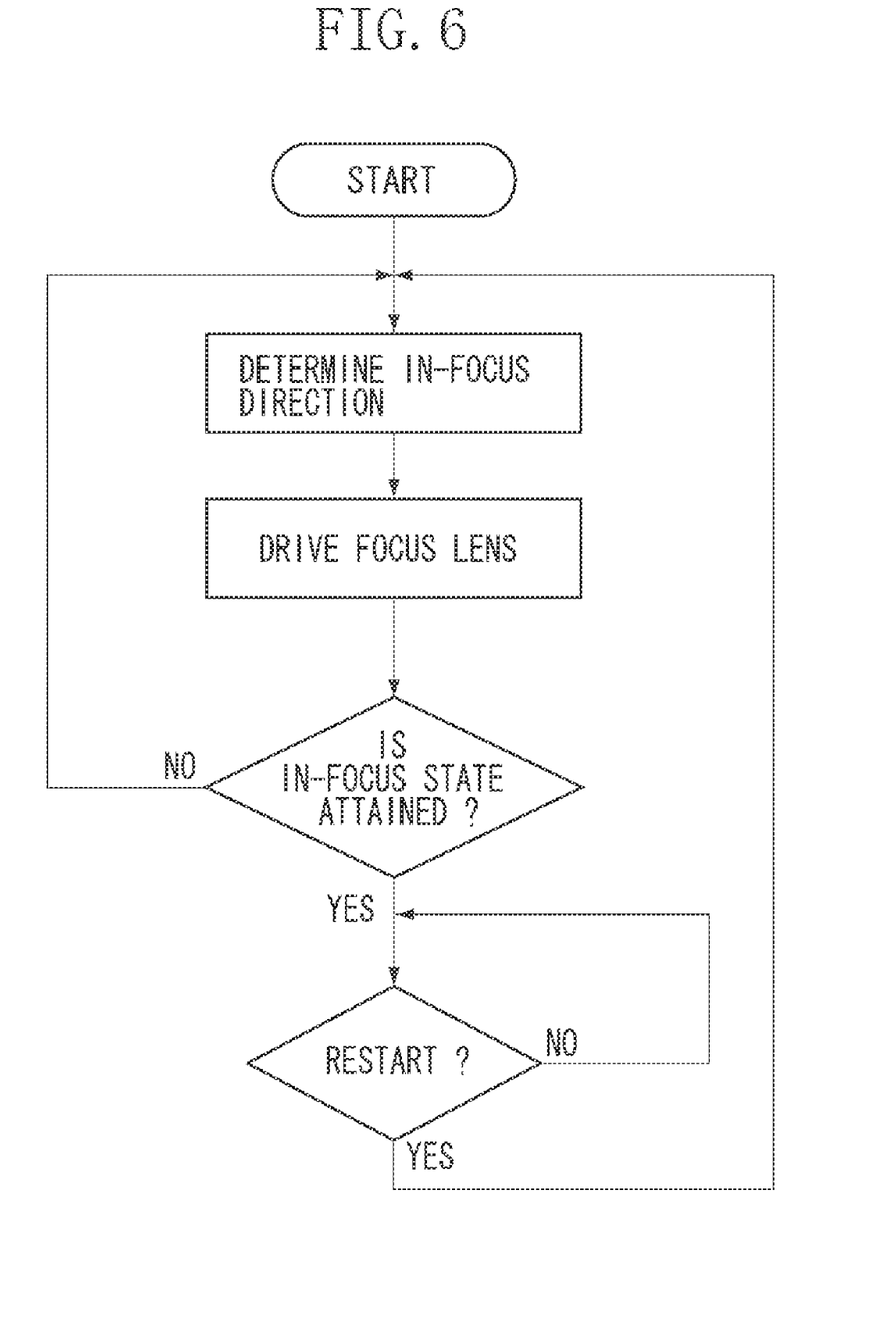
FIG. 6 is a flow chart illustrating a control procedure of the contrast AF method.
Figure 7A:
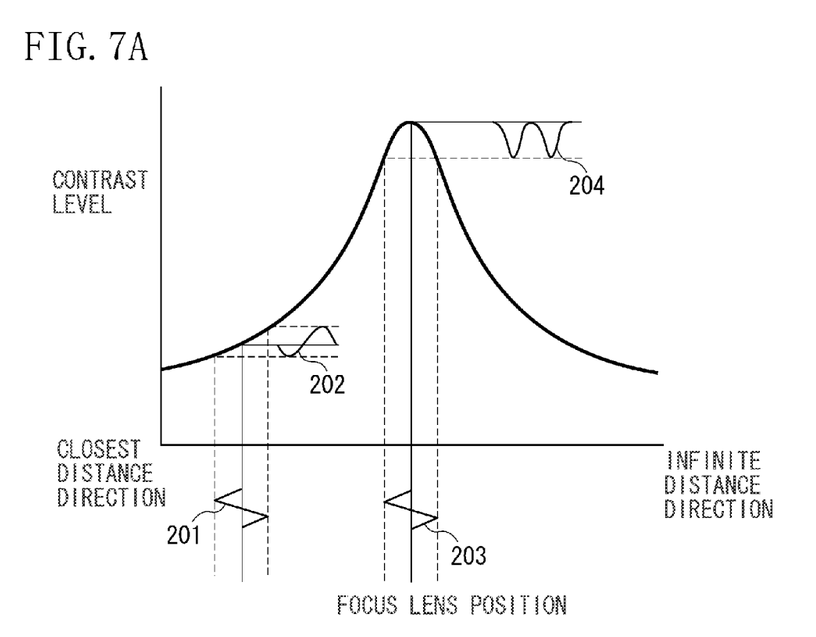
FIGS. 7A and 7B are diagrams illustrating changes in contrast used by the contrast AF method and changes in contrast when conditions change in the contrast AF method.

Focus adjustment methods applied to an optical apparatus such as an electronic still camera includes a method for measuring the distance to an object or a focus adjustment state using a focusing sensor provided separately from an image sensor and attaining an in-focus state by moving a photographic lens to an appropriate position according to the state. On the other hand, a contrast auto focus (AF) method that attains an in-focus state by using an image sensor also as a focusing sensor and moving a photographic lens to a position where the contrast of an object image formed by the photographic lens becomes maximum has been devised. The contrast AF method will be described with reference to FIGS. 6, 7A, and 7B. FIG. 6 is a flow chart illustrating a control procedure of the contrast AF method. FIG. 7A is a diagram illustrating changes in contrast of an object image used by the contrast AF method. In FIG. 6, an in-focus direction determination step is processing to determine in which of a closest distance direction and an infinite distance direction to drive a focus lens to attain an in-focus state. In which direction to drive the focus lens to obtain higher contrast can be determined only after actually moving the focus lens and checking the contrast. Thus, the following control method is devised as a method for detecting in which direction of movement of the focus photographic lens a peak of the contrast is found or determining whether the current state is an in-focus state. As illustrated by curves 201 and 203 in FIG. 7A, a so-called wobbling operation in which the focus lens is caused to reciprocate forward and backward along the optical axis by minute amounts is performed to compare the contrast level of an image at each position of the reciprocation. Then, the direction in which the contrast increases is detected (a curve 202 in FIG. 7A) to cause the photographic lens to move in that direction or an in-focus state is detected (a curve 204 in FIG. 7A) to cause the photographic lens to stop.

Figure 7B:
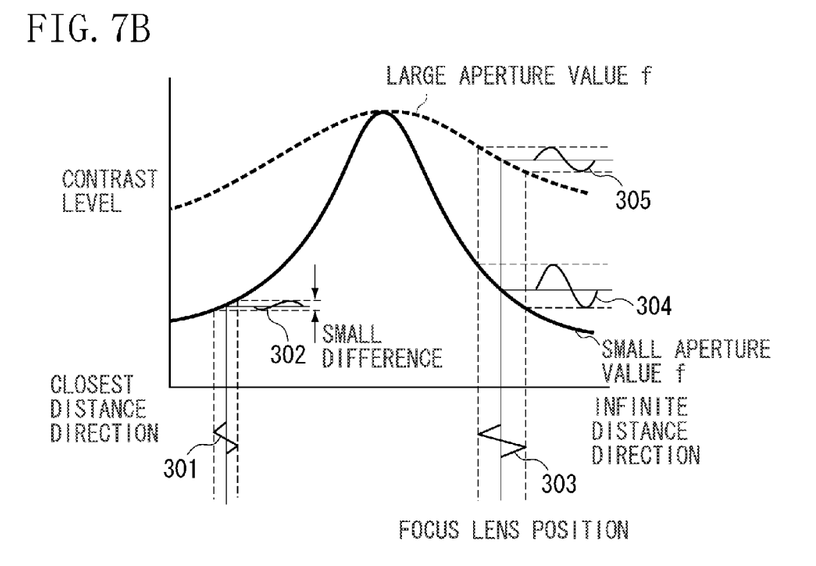

If a wobbling driving amount is small like a curve 301 in FIG. 7B in such a wobbling operation, a clear difference of contrast levels of images to be compared does not appear (a curve 302 in FIG. 7B) so that there is a possibility that an in-focus direction cannot be determined. Thus, it may cause a clear difference of contrast levels of images to be compared to appear by making the wobbling driving amount larger than a predetermined amount. The predetermined wobbling driving amount changes depending on an aperture value f and, as illustrated by curves 304 and 305 in FIG. 7B, a peak of contrast generally becomes flatter and the contrast changes more slowly with an increasing aperture value f compared to a small aperture value f. Thus, a larger wobbling driving amount (a curve 303 in FIG. 7B) is to be set.

When, as described above, the contrast AF method that uses the image sensor also as a focusing sensor is used, an operator can attain an in-focus state while checking an object image through a video display unit in real time. However, if the wobbling driving amount is increased more than necessary, an occurrence of blurring in the object image unallowable for the operator can be considered so that image fluctuations disturbing to the operator may occur. Blurring unallowable for the operator is more likely to occur when a surface on which an object image is actually formed is outside a depth of focus to a focal plane of a light flux from the object. The depth of focus is a range that allows the operator to regard an object image in an in-focus state when an image formation surface is within the range from the focal plane. The depth of focus exists, if the depth of focus is D, in the range of ±D along the optical axis from the focal plane. If the aperture value of the photographic lens is f, the depth of focus D is calculated by using a formula of $D=f \cdot \delta$, where $\delta$ is the diameter of the allowable circle of confusion and empirically takes a value of $P \leq \delta \leq 4 \cdot P$ for an electronic still camera if the pixel pitch of an image sensor is P. Thus, to reduce an occurrence of image fluctuations disturbing to the operator, the wobbling driving amount can be set in such away that the image formation surface is within the depth of focus ±D from the focal plane in an in-focus state. In view of the above circumstances, the wobbling driving amount to determine the in-focus direction or to determine whether in an in-focus state is set as $k \cdot D = k \cdot f \cdot \delta$. k is a constant of proportionality and may be set to ¼ to ¾ empirically.

On the other hand, Japanese Patent Application Laid-Open No. 2005-148610 discusses an apparatus that improves the speed of a focusing operation, when compared with the method for wobbling the photographic lens, by wobbling an image sensor within a limited range during the focusing operation and controlling the operation of the photographic lens based on a sharpness degree (state of blurring) of an image during the wobbling.

If the aperture value f is large in an apparatus according to Japanese Patent Application Laid-Open No. 2005-148610, just like in the case of wobbling a photographic lens, the wobbling driving amount for the image sensor for determining the in-focus direction increases. In such a case, since the image sensor reciprocates a longer stroke in the apparatus, a space for the stroke in the apparatus is to be provided, thus leading to an increase in size of the apparatus.

SUMMARY OF THE INVENTION

According to an aspect of the present invention, an imaging apparatus includes an imaging unit including an image sensor configured to photoelectrically convert an object image formed by a photographic lens, a light-blocking member configured to adjust an exposure time of the image sensor by mechanically closing an aperture to block a light flux from the photographic lens from entering the image sensor through the aperture, and a driving unit configured to drive the imaging unit along an optical axis within a range including a position where at least apart of the imaging unit is inside the aperture of the light-blocking member.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

An imaging apparatus according to an exemplary embodiment of the present invention typically has a control unit described below to control operations thereof. The control unit determines the driving direction of a focus lens by a focus lens driving unit from contrast levels of an object image using an image sensor in reciprocation obtained by changing an optical path length between the focus lens and the image sensor by a wobbling operation of the image sensor periodically reciprocating in the optical axis direction to attain an in-focus state (see the first exemplary embodiment described below). The configuration of the present invention that makes the imaging unit drivable in the above range can also be applied, in addition to the wobbling operation, to a configuration in which the image sensor is moved after the photographic lens being moved to adjust the in-focus state for photographing. Even in such a case, a smaller configuration may be adopted while maintaining a sufficient adjustable range. The imaging apparatus may also be configured to have an image signal processing circuit that converts an electric signal obtained by the image sensor into a video signal and a video display unit that displays the video signal generated by the image signal processing circuit during a live view operation. The control unit inhibits a wobbling operation when the supply voltage is lower than a wobbling inhibition voltage and inhibits a live view operation when the supply voltage is lower than a live view inhibition voltage. The wobbling inhibition voltage is set higher than the live view inhibition voltage (see the second exemplary embodiment described below). The imaging apparatus may also be configured to have a second light-blocking unit that controls the amount of received light by controlling the time during which an electric signal of the image sensor is derived and an image sensor position detection unit that detects the position of the image sensor on the optical axis. Then, the control unit uses the first light-blocking unit and the second light-blocking unit for different purposes depending on the position of the image sensor detected by the image sensor position detection unit in an in-focus state (see the third exemplary embodiment described below).

Figure 1:
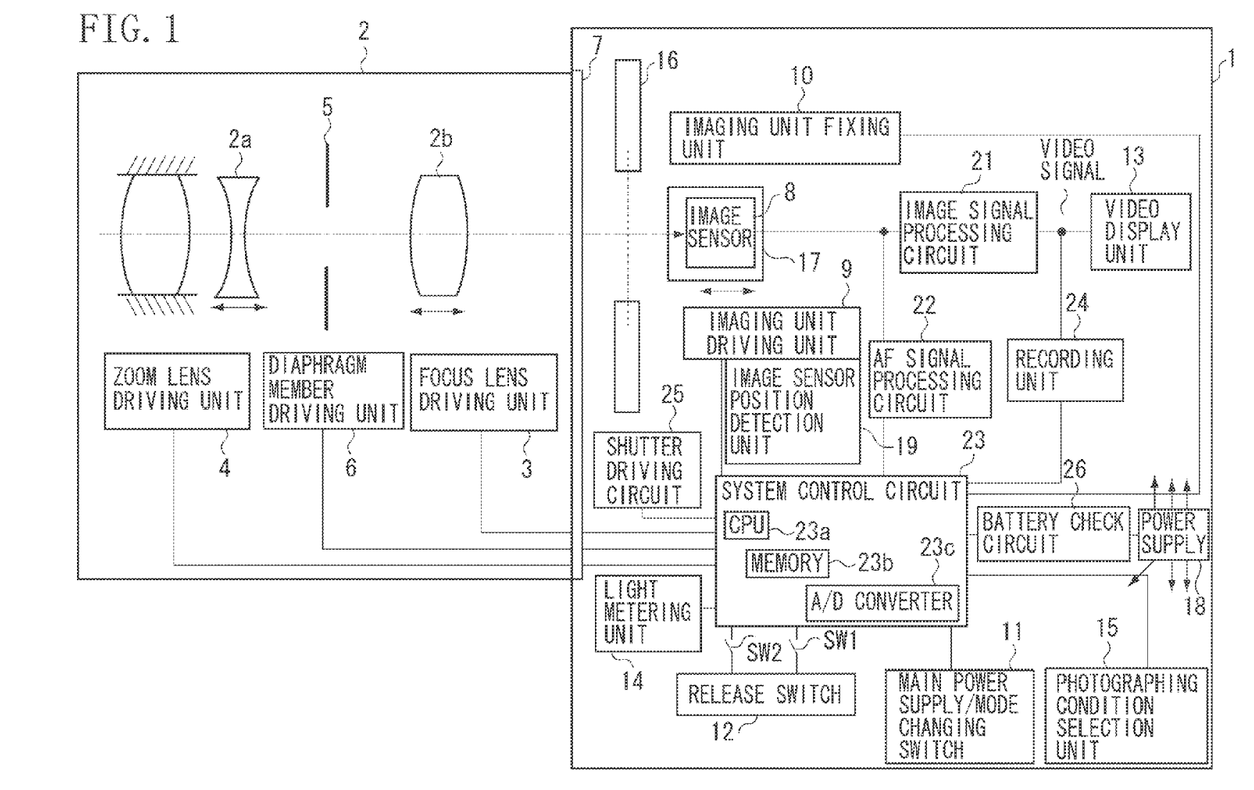
FIG. 1 is a block diagram illustrating the configuration of an imaging apparatus according to a first exemplary embodiment of the present invention.

FIG. 1 is a block diagram illustrating the configuration of an imaging apparatus according to the first exemplary embodiment of the present invention. The imaging apparatus includes a camera body 1 and an interchangeable photographic lens 2. The photographic lens 2 normally includes a plurality of lenses. A zoom lens group 2a changes the focal length of the whole photographic lens 2 by moving on the optical axis. A focus lens 2b is movable in the optical axis direction and the focus lens 2b among the photographic lens 2 moves on the optical axis to attain an in-focus state of an object image formed on the surface of an image sensor 8. A focus lens driving unit 3 has a driving actuator such as a stepping motor or ultrasonic motor that moves the focus lens 2b in the optical axis direction based on instructions from a central processing unit (CPU) 23a in the camera body 1. The focus lens driving unit 3 also has a position detection unit that detects the position of the focus lens 2b on the optical axis and gives feedback of information thereof to the CPU 23a. A zoom lens driving unit 4 moves the zoom lens group 2a along the optical axis of the photographic lens 2. The zoom lens driving unit 4 has a position detection unit that detects the position of the zoom lens group 2a on the optical axis. The operator can manually move the position of the zoom lens group 2a on the optical axis, and position information thereof is transmitted to the CPU 23a.

A diaphragm member 5 changes the aperture value of a light flux incident on the image sensor 8 stepwise or continuously by being driven to change an aperture diameter. A diaphragm member driving unit 6 has a driving actuator such as a stepping motor to drive the diaphragm member 5 and an aperture value detection unit that detects the aperture value of the diaphragm member 5. The diaphragm member driving unit 6 changes the aperture diameter of the diaphragm member 5 based on instructions from the CPU 23a, and feedback of aperture value information thereof is given to the CPU 23a. The photographic lens 2 is mounted and fixed to a camera mount unit 7.

The image sensor 8 photoelectrically convert an object image formed on the surface of the image sensor 8 by the photographic lens 2. A complementary metal-oxide semiconductor (CMOS) sensor, a charge-coupled device (CCD) sensor, or the like can be used as the image sensor 8. The image sensor 8 in the present exemplary embodiment includes an electronic shutter as a second light-blocking unit and can control the amount of received light by controlling the time during which an electric signal is derived without a photographic light flux being blocked mechanically. An imaging unit 17 includes the image sensor 8, an optical low-pass filter, an infrared cut filter, and a member to hold these. The optical low-pass filter separates a light flux incident on the image sensor 8 into a plurality of light fluxes to effectively reduce an occurrence of false analytic signal or false color signal. The infrared cut filter cuts off unnecessary infrared light. An imaging unit fixing unit 10 fixes the imaging unit 17 by mechanical fitting based on instructions from the CPU 23a. Accordingly, the distance on the optical axis between the surface of the image sensor 8 and the camera mount unit 7 is prevented from changing from a predetermined amount by a disturbance such as an impact. An imaging unit driving unit 9 has a driving actuator to drive the imaging unit 17 in the optical axis direction and a position detection unit 19 that detects the position of the image sensor 8 on the optical axis. A photo sensor or a sensor using magnetism like a Hall element can be used as the image sensor position detection unit 19. Alternatively, the image sensor position detection unit 19 may be a unit obtained by providing an electric contact in a moving unit and a fixed unit of the imaging unit driving unit 9 to detect the position based on changes in resistance. The image sensor driving actuator may be a unit using electromagnetic force such as a voice coil motor and stepping motor or a unit using a piezoelectric element.

A main power supply/mode changing switch 11 can turn on/turn off the whole apparatus or change/set the mode for photographing/reproduction by manually being operated by an operator. A release switch 12 inputs start timing of a photographing operation in a photographing mode and a switch 1 (SW1) is turned on by only a first stroke being pressed and a switch 2 (SW2) is turned on further by only a second stroke being pressed. A video display unit 13 displays a video signal of still images, moving images and the like to the operator. The video display unit 13 also displays a video signal obtained from an image signal processing circuit 21 during a live view operation to the operator. A liquid crystal monitor, an organic electroluminescence (EL) monitor or the like may be used as the video display unit 13.

A light metering unit 14 can acquire brightness information of an object. The acquired brightness information is transmitted to the CPU 23a. When, for example, a shutter speed priority mode is set, the CPU 23a calculates an appropriate aperture value based on brightness information from the light metering unit 14, information of the set International Organization for Standardization (ISO) sensitivity, and the shutter speed. Then, the CPU 23a controls the diaphragm member driving unit 6 to drive the diaphragm member 5 so that an appropriate exposure is achieved. The operator can change photographing conditions such as the aperture value, the shutter speed, the ISO sensitivity, and white balance before or during photographing by manually operating a photographing condition selection unit 15. In the present exemplary embodiment, a mechanical focal plane shutter is used as a light-blocking unit 16. The light-blocking unit 16 blocks a photographic light flux while a user observes an object image through a finder. The light-blocking unit 16 is configured in such a way that a desired exposure time is obtained based on a running time difference of a first shutter blade group and a second shutter blade group (not illustrated) according to a release signal during photographing. A power supply 18 supplies power to each unit of the imaging apparatus.

The image signal processing circuit 21 processes an electric signal from the image sensor 8 for conversion into a video signal. An AF signal processing circuit 22 extracts contrast levels at predetermined positions from the video signal to calculate an AF evaluation value used for contrast AF. A system control circuit 23 includes the CPU 23a, a memory 23b, an analog-to-digital (A/D) converter 23c, and the like. The system control circuit 23 supplies power to blocks based on a video signal, the AF evaluation value, and information from the main power supply/mode changing switch 11 and other detection units arranged in the camera body 1 and the photographic lens 2. The system control circuit 23 also drives the focus lens 2b through the focus lens driving unit 3 and controls the diaphragm member 5 through the diaphragm member driving unit 6. Further, the system control circuit 23 performs control or performs an operation for the whole imaging apparatus such as calculation of the current depth of focus from aperture value information. The system control circuit 23 also has a unit that determines the moving direction of the focus lens 2b to attain an in-focus state or determines whether in an in-focus state from the AF evaluation value of video extracted by the AF signal processing circuit 22. A recording unit 24 records a video signal obtained from the image signal processing circuit 21. A shutter driving circuit 25 controls driving of the shutter 16 based on instructions from the system control circuit 23. A battery check circuit 26 checks batteries of the power supply 18 according to instructions from the system control circuit 23 and sends a detection result thereof to the system control circuit 23.

Figure 2A:
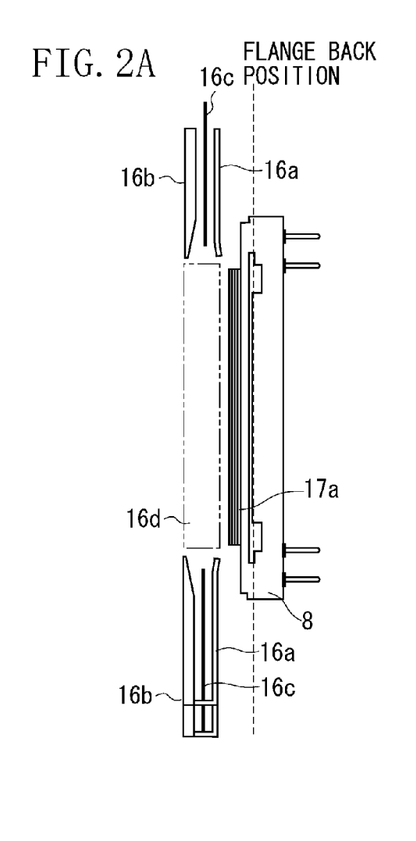
FIGS. 2A to 2C are positional relationship diagrams between a shutter, which is a light-blocking unit, and an imaging unit.
Figure 2B:
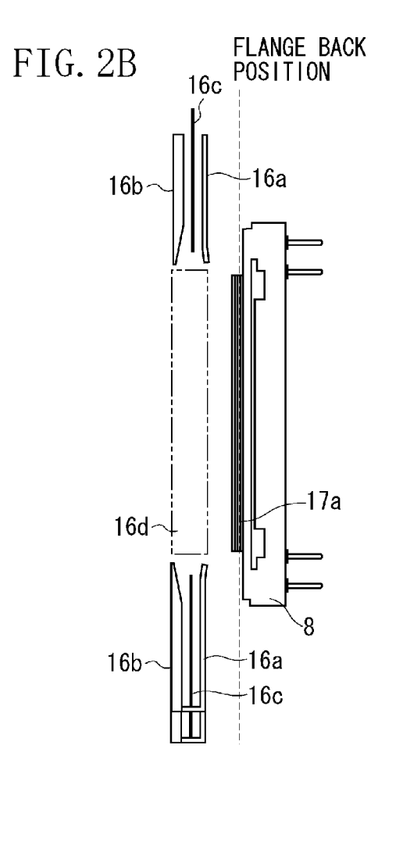
Figure 2C:
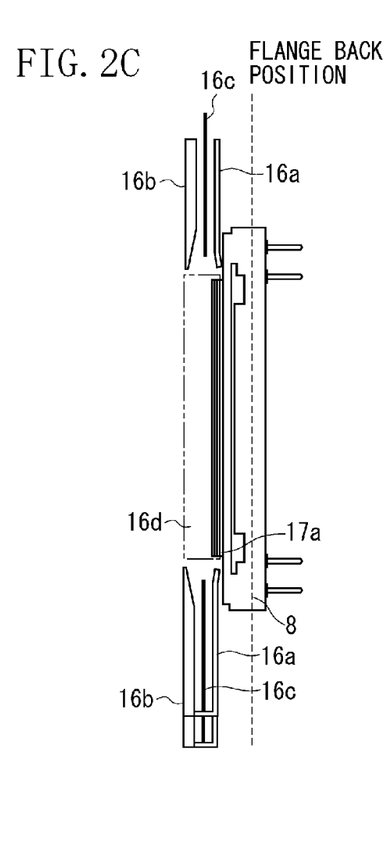

Next, the positional relationship between the shutter 16, which is a light-blocking unit in the present exemplary embodiment, and the imaging unit 17 will be described with reference to FIGS. 2A to 2C. FIG. 2A illustrates the positional relationship between the shutter 16 and the imaging unit 17 during photographing of a normal still image, and FIGS. 2B and 2C each illustrate the position of the imaging unit 17 during a wobbling operation. FIG. 2B illustrates a state in which the imaging unit 17 is located farthest from the mount unit, and FIG. 2C illustrates a state in which the imaging unit 17 is located closest to the mount unit. In FIGS. 2A to 2C, a shutter cover plate 16a and a shutter base plate 16b each have a substantially rectangular aperture larger than an effective area of the image sensor 8. A shutter curtain 16c runs between the shutter cover plate 16a and the shutter base plate 16b according to a release signal during photographing to block light incident on the image sensor 8. Since the shutter curtain 16c runs while deviating in the optical axis direction, edges forming the aperture of the shutter cover plate 16a are bent toward the imaging unit 17 so that the shutter curtain 16c is not prevented from running. A shutter aperture 16d (a region enclosed by a chain double-dashed line in FIGS. 2A to 2C) indicates a space from a bent end face of the shutter cover plate 16a to a mount unit surface of the shutter base plate 16b. If the shutter curtain 16c runs while another member is present in the shutter aperture 16d, the shutter curtain may be damaged.

A member 17a is a member obtained by pasting an optical low-pass filter and an infrared cut filter. In the state illustrated in FIG. 2A, as described above, an imaging surface of the image sensor 8 matches the flange back position. Moreover, the shutter aperture 16d and the imaging unit 17 do not interfere with each other and there is no possibility of the shutter curtain 16c being damaged even if the shutter curtain 16c runs for photographing of a still image. In the state illustrated in FIG. 2B, the imaging surface of the image sensor 8 is positioned on the backward side of the flange back position. Also in this case, the shutter aperture 16d and the imaging unit 17 do not interfere with each other and there is no possibility of the shutter curtain 16c being damaged even if the shutter curtain 16c runs for photographing of a still image. In the state illustrated in FIG. 2C, by contrast, the imaging surface of the image sensor 8 is positioned on the forward side of the flange back position. The shutter aperture 16d and the imaging unit 17 interfere with each other, and if the shutter curtain 16c runs for photographing of a still image, the shutter curtain 16c may be damaged. When a wobbling operation is started, the imaging unit 17 is reciprocated forward and backward along the optical axis by minute amounts. More specifically, the imaging unit reciprocates in the order like FIGS. 2A→2B→2A→2C→2A→2B→2A . . . .

Figure 3:
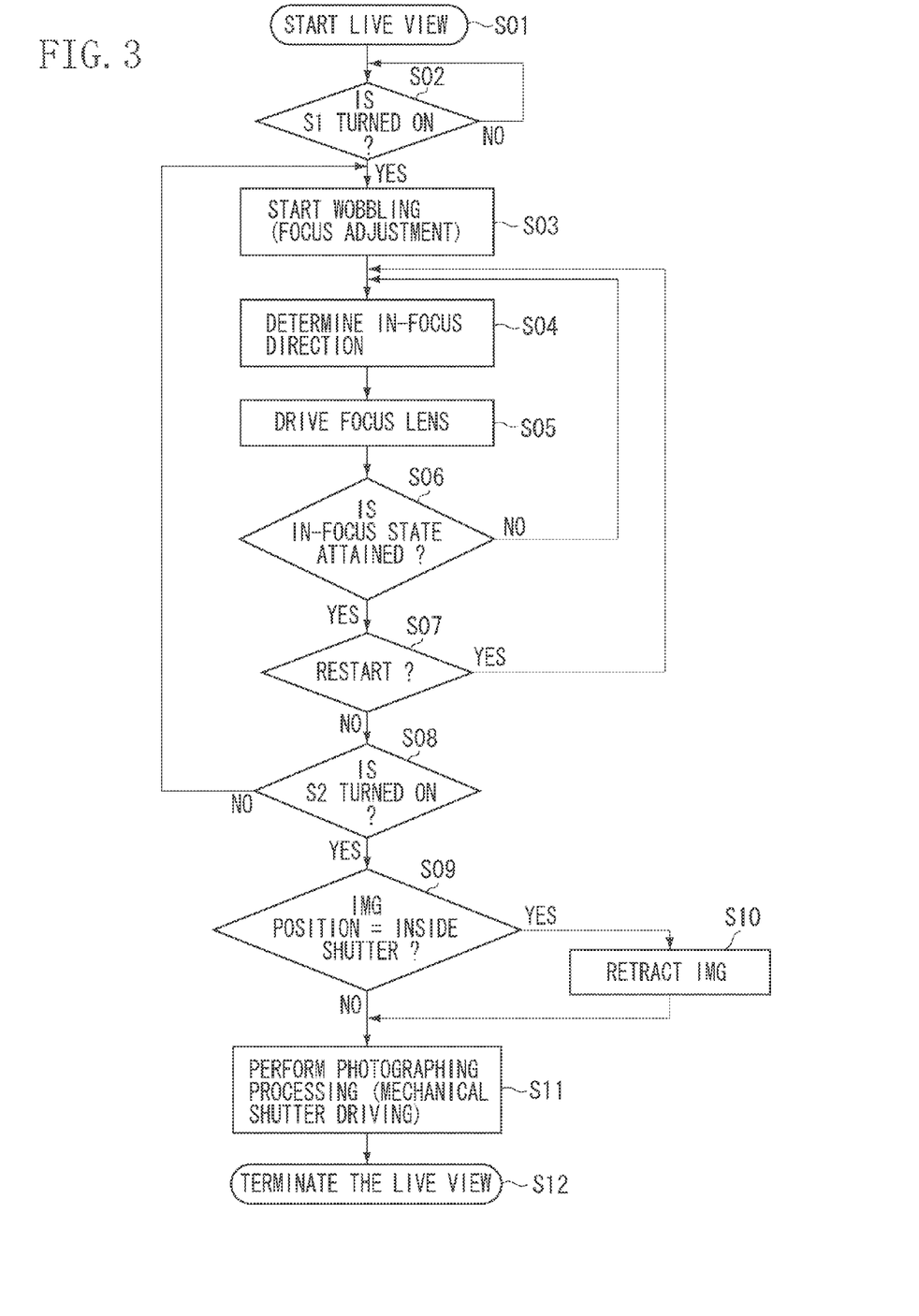
FIG. 3 is a flow chart illustrating a procedure for a focusing operation in the first exemplary embodiment.

Next, a photographing operation in live view mode by the imaging apparatus with the above configuration will be described with reference to the flowchart of FIG. 3. When the live view mode is first set by the main power supply/mode changing switch 11, the system control circuit 23 is turned on. Then, in step S01, based on instructions from the CPU 23a, an electric signal of an object image is output from the image sensor 8 to the image signal processing circuit 21 where the electric signal is converted into a video signal. The converted video signal is output to the video display unit 13 so that the operator can check how the object image looks via the video display unit 13. Next, in step S02, when the switch 1 is turned on by the release switch 12 being pressed only up to the first stroke by the operator, an auto focus adjustment by a wobbling operation is started. When a focus adjustment operation is started, the imaging unit fixing unit 10 is driven by an active signal from the CPU 23a so that fixing of the image sensor 8 by the imaging unit fixing unit 10 is released. Then, in step S03, the imaging unit driving unit 9 is driven by the active signal from the CPU 23a to start the wobbling operation. At this point, the wobbling driving amount may be set so that the driving amount falls within the depth of focus ±D described above.

In the system control circuit 23, the CPU 23a causes the memory 23b to store the AF evaluation value output from the AF signal processing circuit 22 during the wobbling operation for comparison while correlating with each position of the image sensor 8. In this manner, in step S04, the CPU 23a determines the driving direction of the focus lens 2b. Next, in step S05, an active signal is sent from the CPU 23a to the focus lens driving unit 3 to cause the focus lens driving unit 3 to drive the focus lens 2b in the direction determined by wobbling of the image sensor 8. Further, in step S06, the CPU 23a determines whether an in-focus state has been attained by wobbling of the image sensor 8, and if no in-focus state has been attained as a result thereof, the processing returns to step S04. If an in-focus state has been attained, the CPU 23a stops wobbling of the image sensor 8 and driving of the focus lens 2b and sends an active signal so that the imaging unit fixing unit 10 fixes the image sensor 8.

Then, in step S07, the CPU 23a monitors fluctuations of the AF evaluation value and determines whether to restart wobbling of the image sensor 8 and driving of the focus lens 2b based on information of changes of the AF evaluation value. If wobbling of the image sensor 8 and driving of the focus lens 2b should be restarted, the processing returns to the in-focus determination in step S04 again. In step S08, if the switch 2 is turned on by the release switch 12 being pressed up to the second stroke when wobbling of the image sensor 8 and driving of the focus lens 2b should not be restarted, the image sensor position detection unit 19 detects the position of the image sensor (IMG) 8 and sends the position information to the system control circuit 23. In step S09, the CPU 23a determines whether the position of the image sensor 8 is inside the aperture 16d of the shutter 16. If the position of at least a part of the image sensor 8 or the imaging unit 17 is inside the aperture of the shutter 16, then in step S10, the CPU 23a retracts the image sensor 8 from inside the aperture of the shutter 16. If the position of the image sensor 8 is outside the aperture of the shutter 16, then in step S11, the shutter 16 is driven at a shutter speed set by the photographing condition selection unit 15. Next, in step S12, a video signal is recorded on the recording unit 24 and, then, the live view mode is terminated.

According to the present exemplary embodiment, as described above, at least a part of an imaging unit is made movable into a shutter aperture during a wobbling operation. Therefore, an auto focus can be adjusted or detected with a smaller configuration while sufficiently maintaining a wobbling driving amount for determination of the in-focus direction.

While a second exemplary embodiment of the present invention has a configuration similar to that of the first exemplary embodiment, the photographing operation in the live view mode is different. The photographing operation through the live view in the second exemplary embodiment will be described with reference to the flow chart of FIG. 4.

Figure 4:
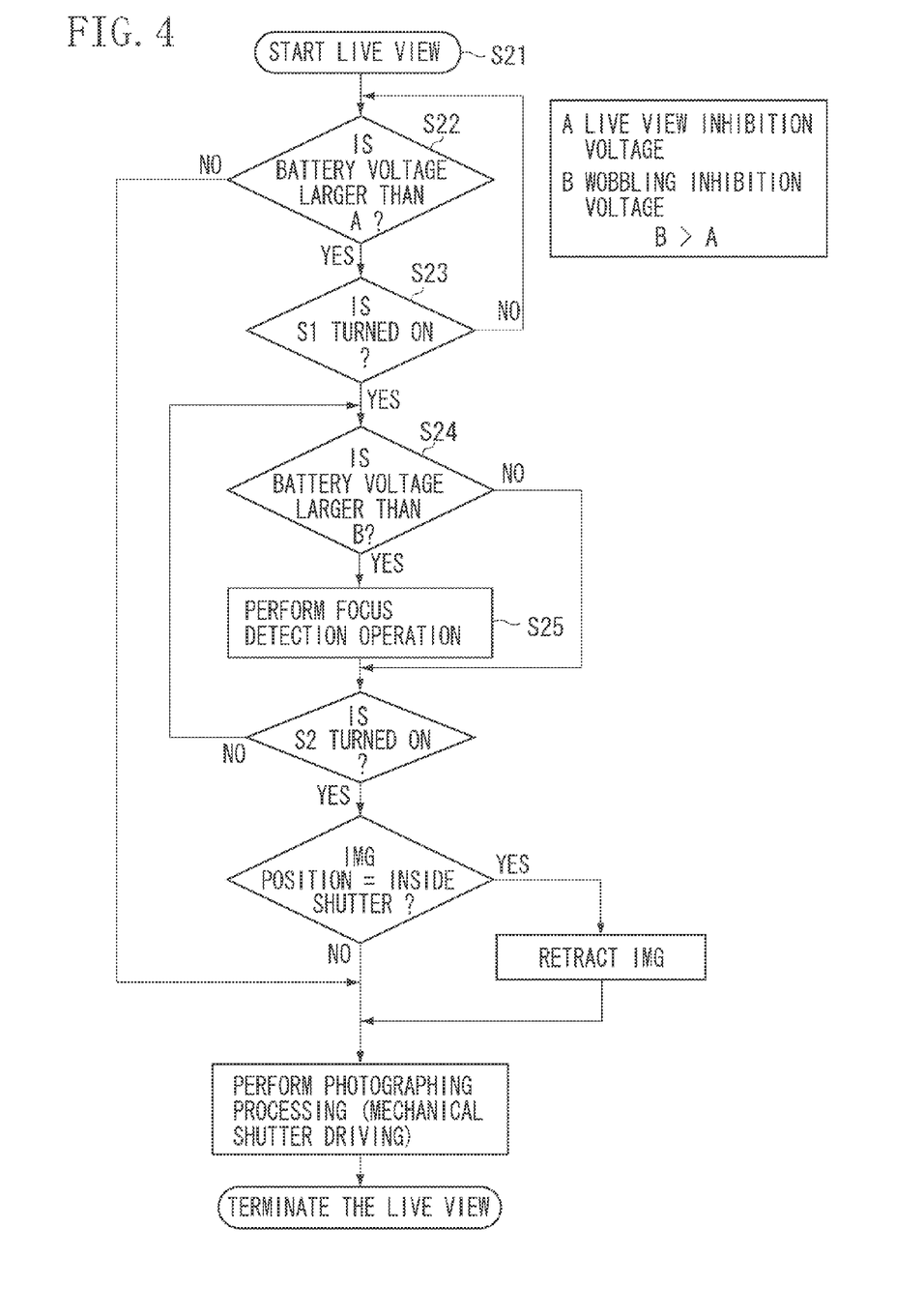
FIG. 4 is a flow chart illustrating the procedure for a focusing operation in a second exemplary embodiment of the present invention.

In step S21, when the live view mode is started, the battery check circuit 26 checks the voltage of the power supply 18 according to instructions from the system control circuit 23 and sends the voltage to the system control circuit 23. In step S22, the system control circuit 23 compares the voltage sent from the battery check circuit 26 and a predetermined live view inhibition voltage. If the voltage sent from the battery check circuit 26 is equal to or lower than the predetermined live view inhibition voltage, the system control circuit 23 terminates the live view mode. If the voltage sent from the battery check circuit 26 is higher than the predetermined live view inhibition voltage, then in step S23, the system control circuit 23 continues the live view mode until the switch 1 is turned on, while checking batteries at predetermined intervals.

Next, when the switch 1 is turned on by the release switch 12 being pressed only up to the first stroke by the operator, the battery check circuit 26 checks the voltage of the power supply 18 according to instructions from the system control circuit 23 and sends the voltage to the system control circuit 23. In step S24, the system control circuit 23 compares the voltage sent from the battery check circuit 26 and a predetermined wobbling inhibition voltage. The wobbling inhibition voltage is set higher than the live view inhibition voltage. If the voltage sent from the battery check circuit 26 is equal to or lower than the predetermined wobbling inhibition voltage, the system control circuit 23 displays a warning on the video display unit 13 indicating that auto focus detection by wobbling is not practicable. If the voltage sent from the battery check circuit 26 is higher than the predetermined wobbling inhibition voltage, then in step S25, auto focus detection by wobbling is carried out. Details of auto focus detection by wobbling are similar to steps S04 to S07 in the first exemplary embodiment. Also, subsequent processing up to the termination of live view is similar to that in the first exemplary embodiment and, therefore, a description thereof will not be repeated.

In the present exemplary embodiment, an inhibition voltage for the wobbling operation is set higher than an inhibition voltage for the live view operation and, therefore, a shutter curtain can be prevented from running due to a drop in supply voltage during the wobbling operation, so that the possibility of the shutter curtain being damaged can be reduced.

While a third exemplary embodiment of the present invention also has a configuration similar to that of the first exemplary embodiment, the photographing operation in the live view mode is different. The photographing operation through the live view in the third exemplary embodiment will be described with reference to the flow chart of FIG. 5.

Figure 5:
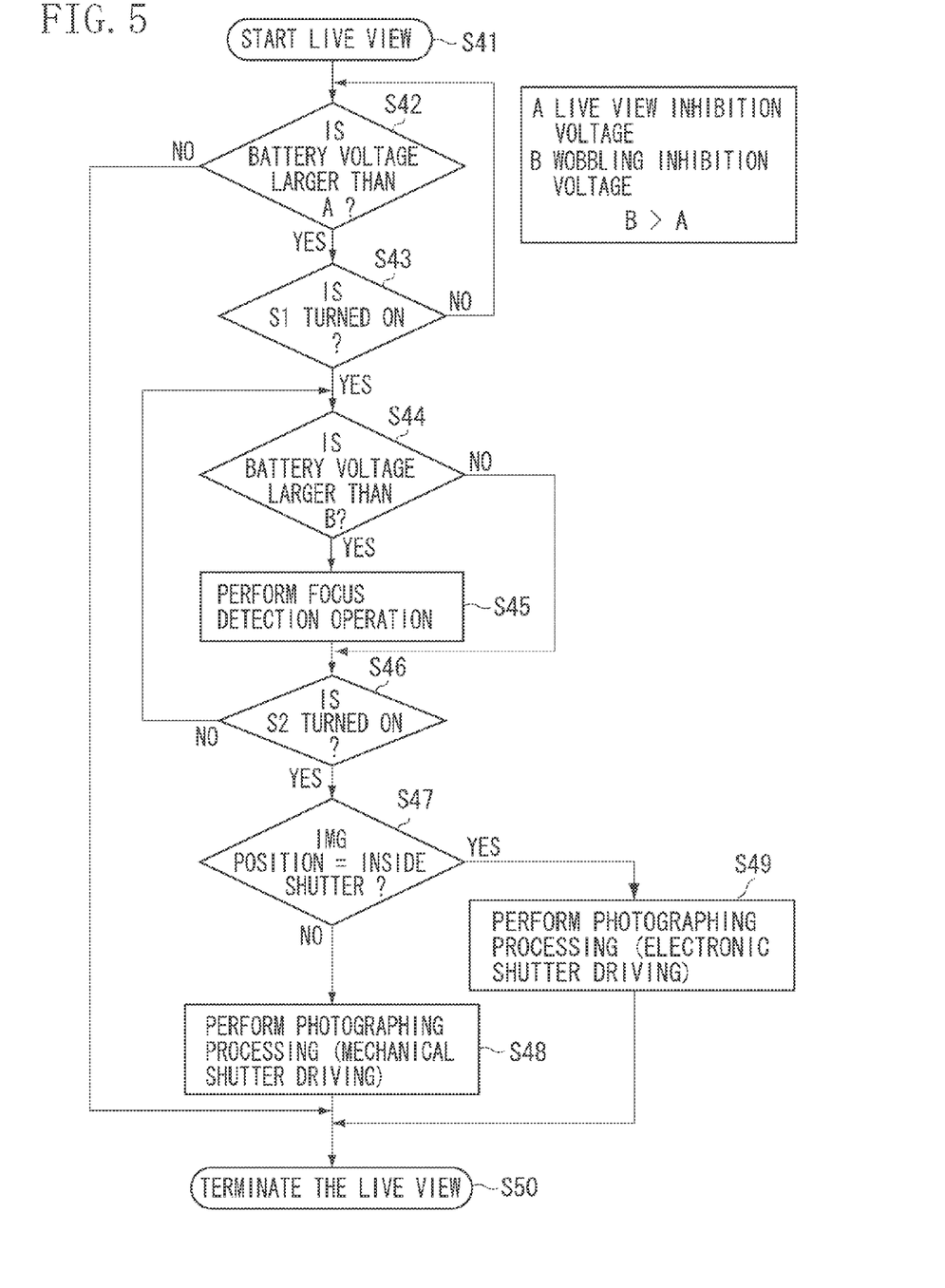
FIG. 5 is a flow chart illustrating the procedure for a focusing operation in a third exemplary embodiment of the present invention.

The processing from starting a live view in step S401 to determining whether the position of the image sensor 8 is inside the aperture of the shutter 16 in step S47 is similar to that in the second exemplary embodiment. The present exemplary embodiment is different in the following point. If the position of at least a part of the image sensor 8 or the imaging unit 17 is inside the aperture 16d of the shutter 16, then in step S49, the electronic shutter, which is the second light-blocking unit, is driven according to the shutter speed set for the photographing condition selection unit 15 to perform photographing processing. On the other hand, if the position of the image sensor 8 is outside the aperture 16d of the shutter 16, then in step S48, the mechanical shutter 16, which is the first light-blocking unit, is driven according to the shutter speed set for the photographing condition selection unit 15. Next, in step S50, a video signal is recorded in the recording unit 24 and, then, the live view mode is terminated.

In the present exemplary embodiment, also when the switch 2 (SW2) is operated for photographing of a still image while at least a part of an imaging unit is inside a shutter aperture during a wobbling operation, a light-blocking unit is operated directly. In this case, however, instead of a mechanical shutter, an electronic shutter operates so that a shutter curtain will not be damaged. Moreover, a still image is immediately photographed after the switch 2 (SW2) is operated without an imaging unit being retracted from inside the shutter aperture, so that the still image can be photographed in a shorter release time lag.

According to an imaging apparatus in an exemplary embodiment of the present invention, an imaging unit including an image sensor is movable along the optical axis up to a position where at least a part thereof is inside an aperture of a light-blocking unit. Therefore, for example, a part of stroke for a wobbling operation can use a space of the shutter aperture, so that a smaller configuration can be adopted to make auto focus adjustments while maintaining a sufficient wobbling driving amount for determining an in-focus direction or an in-focus state.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-158481 filed Jul. 3, 2009, which is hereby incorporated by reference herein in its entirety.

What is claimed is:

1. An apparatus comprising:
an imaging unit including an image sensor configured to photoelectrically convert an object image formed by a photographic lens;
a light-blocking member configured to adjust an exposure time of the image sensor by mechanically closing an aperture to block a light flux from the photographic lens from entering the image sensor through the aperture; and
a driving unit configured to drive the imaging unit along an optical axis within a range including a position where at least a part of the imaging unit is inside the aperture of the light-blocking member.

2. The apparatus according to claim 1, further comprising a controller configured to control an operation of the apparatus,
wherein the controller determines a driving direction of a focus lens of the photographic lens based on contrast information about the object image using the image sensor in reciprocation obtained by changing an optical path length between the focus lens and the image sensor by a wobbling operation of the image sensor periodically reciprocating in an optical axis direction to attain an in-focus state.

3. The apparatus according to claim 2, further comprising:
a processing circuit configured to convert an electric signal obtained by the image sensor into a video signal; and
a display unit configured to display the generated video signal during a live view operation,
wherein the controller inhibits the wobbling operation when a supply voltage is equal to or lower than a wobbling inhibition voltage, and inhibits the live view operation when the supply voltage is equal to or lower than a live view inhibition voltage, and
wherein the wobbling inhibition voltage is set higher than the live view inhibition voltage.

4. The apparatus according to claim 2, further comprising:
a control unit configured to control an amount of received light by controlling a time during which an electric signal of the image sensor is derived; and
a detection unit configured to detect a position of the image sensor on the optical axis,
wherein the controller switches between light-blocking by the light-blocking member and controlling by the image sensor control unit according to the detected position in an in-focus state.

5. A method comprising:
photoelectrically converting an object image formed by a photographic lens by an imaging unit including an image sensor;
Using a light-blocking member to adjust an exposure time of the image sensor by mechanically closing an aperture of the light-blocking member to block a light flux from the photographic lens from entering the image sensor through the aperture; and
driving the imaging unit along an optical axis within a range including a position where at least a part of the imaging unit is inside the aperture of the light-blocking member.

\* \* \* \* \*